United States Patent [19]

Abe

[11] Patent Number: 5,146,082

[45] Date of Patent: Sep. 8, 1992

[54] IMAGE DETECTING UNIT HAVING EMITTING MEANS AND LIGHT RECEIVING MEANS AND METHOD FOR ARRANGING THE LIGHT EMITTING MEANS AND THE LIGHT RECEIVING MEANS

[75] Inventor: Hiroyuki Abe, Sendai, Japan

[73] Assignees: Ricoh Company, Ltd., Tokyo; Ricoh Research Institute of General Electronics Co., Ltd., Natori, both of Japan

[21] Appl. No.: 604,461

[22] Filed: Oct. 29, 1990

[30] Foreign Application Priority Data

Oct. 30, 1989 [JP] Japan .................................. 1-282649

[51] Int. Cl.$^5$ .............................................. H01J 5/16
[52] U.S. Cl. .......................... 250/227.20; 250/227.29; 358/484
[58] Field of Search ....................... 250/227.20, 227.26, 250/227.29, 227.31, 208.1; 358/484; 350/96.3, 96.12; 359/130, 123, 127, 116

[56] References Cited

U.S. PATENT DOCUMENTS

| | | | |
|---|---|---|---|
| 4,227,078 | 10/1980 | Yamamoto et al. | 250/227.26 |
| 4,233,506 | 11/1980 | Yamamoto et al. | 250/227.26 |
| 4,495,412 | 1/1985 | Thoone et al. | 250/227.26 |
| 4,671,612 | 6/1987 | Sakurai et al. | 250/227.2 |
| 4,942,481 | 7/1990 | Yoshinouchi et al. | 358/484 |

FOREIGN PATENT DOCUMENTS 0149172 11/1981 Japan .................................. 358/484

Primary Examiner—David C. Nelms
Assistant Examiner—Michael Messinger
Attorney, Agent, or Firm—Oblon, Spivak, McClelland, Maier & Neustadt

[57] ABSTRACT

An image detecting unit includes a light emitting system for emitting a light beam which is projected onto a surface of a document and a light receiving system for receiving a light obtained by a reflection of the light emitted from the light emitting system on the surface of the medium. The light receiving system includes optical waveguides and photoelectric conversion devices coupled to the optical waveguides. The light emitted from the light emitting system is projected on an area on the surface of the document, to which an end surface of the optical waveguide is opposed, and an incident angle $\phi$ of the light incident on the surface of the document is determined by the following formula;

$$\phi_0 - 25° < \phi < \phi_0 + \sim°$$

where $\phi_0$ represents an optimum incident angle.

7 Claims, 8 Drawing Sheets

IMAGE DETECTING UNIT HAVING EMITTING MEANS AND LIGHT RECEIVING MEANS AND METHOD FOR ARRANGING THE LIGHT EMITTING MEANS AND THE LIGHT RECEIVING MEANS

BACKGROUND OF THE INVENTION

The present invention generally relates to an image detecting unit, and more particularly to an image detecting unit which is suited for use in an optical image reading device such as would be found in a facsimile, a copy machine and the like.

An optical image reading device has an image detecting unit. The image detecting unit includes a light emitting part which irradiates images on a medium and a light receiving part which receives a reflected light obtained by a reflection of the light emitted from the light emitting part on a surface of the medium.

Conventional image detecting units are disclosed in Japanese Laid-Open Patent Application Nos. 60-124165, 61-278265 and 63-299269. In each of these conventional image detecting units, a light beam emitted from the light emitting part is made thin and is slantingly incident on the surface of the medium so that the light emitted from the light emitting part is efficiently used for detecting an image.

An edge receiving type image detecting unit has been proposed. In the edge receiving type image detecting unit, the light receiving part has an optical waveguide comprising a core layer and a clad layer which surrounds the core layer. The reflected light from the medium is incident on an end surface of the optical waveguide, and then an incident light on the surface of the optical waveguide is transmitted through the optical waveguide to an optical detecting device.

A resolving power of the edge receiving type image detecting unit is determined on the basis of the critical angle of the optical waveguide and the distance between the surface of the medium (document) and the light receiving part of the edge receiving type image detecting unit. The critical angle of the optical waveguide is determined on the basis of refractive indexes of the core layer and the clad layer. The critical angle of the optical waveguide increases when the ratio between the refractive indexes of the core layer and the clad layer increases. When the critical angle increases, the amount of the light transmitted through the optical waveguide also increases, but the resolving power of the image detecting unit decreases. If there is a smaller distance between the document and the light receiving part becomes smaller, the resolving power of the image detecting unit is increased. However, when the distance between the document and the light receiving part becomes too small, it becomes difficult for the light beam from the light emitting part to be incident on the surface of the document. Therefore, the amount of the light transmitted through the optical waveguide becomes insufficient for detecting the image so that a signal-to-noise ratio of an image signal obtained by the light receiving part decreases. On the other hand, when the distance between the document and the light receiving part becomes too large, the resolving power and the amount of the light transmitted through the optical waveguide respectively decrease.

Accordingly, to obtain both a good resolving power and a sufficient amount of light transmitted through the optical waveguide, it is necessary to make the distance between the document and the light receiving part relatively small. In addition, it is also necessary for the light beam from the light emitting part to be thin and to be slantingly incident on an area, on the document, to which the end surface of the optical waveguide is directly opposed.

In conventional edge receiving type image detecting units, the light from the light emitting part is incident on the surface of the document in an arbitrary angle with regard to a normal direction of the surface of the document. That is, conventionally, the light from the light emitting part is slantingly incident on the surface of the document, but the optimum incident angle of the light beam to the surface of the document has not been yet examined. The incident angle of the light beam is defined as the angle between the light beam and the normal direction of the surface of the document. In addition, the relationship between the resolving power of the light receiving part and the distance between the light receiving part and the document has been not quantitatively studied.

SUMMARY OF THE INVENTION

Accordingly, a general object of the present invention is to provide an image detecting unit in which the disadvantages of the aforementioned prior art devices are eliminated.

A more specific object of the present invention is to provide an image detecting unit for which it is possible to obtain a higher resolving power and a sufficient amount of light for detecting an image.

The above objects of the present invention are achieved by an image detecting unit comprising light emitting means for emitting a light beam which is projected onto a surface of a medium on which an image is formed, and light receiving means, provided close to the light emitting means, for receiving a light obtained by a reflection of the light emitted from the light emitting means on the surface of the medium, the light receiving means comprising, optical waveguide means, having a core layer, a clad layer surrounding the core layer and an end surface opposite to the surface of the medium, the light incident on the end surface being transmitted through the optical waveguide, and photoelectric conversion means, coupled to the optical waveguide, for converting the light transmitted through the optical waveguide to the photoelectric conversion means into an image signal, wherein the light emitted from the light emitting means is projected on an area, on the surface of the medium, to which the end surface of the optical waveguide means is opposed, and an incident angle $\phi$ of the light incident on the surface of the medium is determined by the following formula;

$$\phi_0 - 25° < \phi < \phi_0 + 18°$$

where the incident angle is an angle between the light beam emitted from the light emitting means and a normal direction of the surface of the medium and $\phi_0$ represents an optimum incident angle, the optimum incident angle being an incident angle in which the amount of light transmitted through the optical waveguide means to the photoelectric conversion means becomes approximately a maximum.

Additional objects, features and advantages of the present invention will become apparent from the fol-

DESCRIPTION OF THE PREFERRED EMBODIMENTS

A description will now be given of a basic structure of a image detecting unit according to an embodiment of the present invention with reference to FIG. 1.

Figure 1:
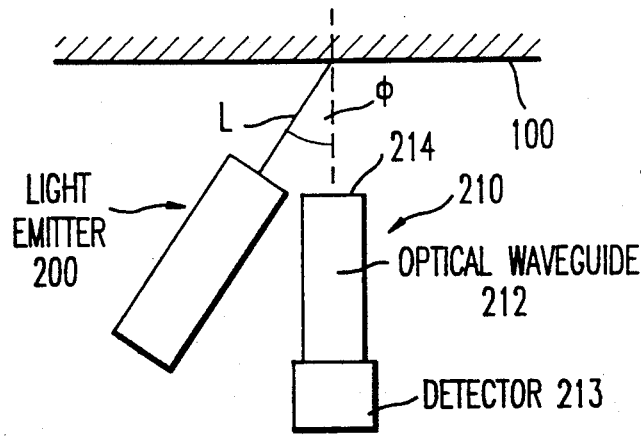
FIG. 1 is a block diagram illustrating a basic structure of the image detecting unit according to an embodiment of the present invention.

Referring to FIG. 1, which shows an edge receiving type image detecting unit, the image detecting unit has a light emitting system 200 and a light receiving system 210. The light emitting system 200 shown in FIG. 1 corresponds to one pixel. The light receiving system 210 includes an optical waveguide 212 and a optical detecting device 213. The light emitting system 200 emits a light beam (L). The light beam (L) is incident on a surface of the document 100 which is a medium on which images are formed. An incident angle of the light beam (L) is $\phi$. An area on which the light beam (L) is incident is opposed to an end surface 214 of the optical waveguide 210 of the image detecting unit. The light beam (L) from the light emitting system 200 is irregularly reflected, and then a part of the irregular reflection light from the surface of the document is incident on the end surface of the optical waveguide 212. The light incident on the end surface 214 is transmitted through the optical waveguide 212 to the detecting device 213. The detecting device 213 outputs an image signal for one pixel when the light transmitted through the optical waveguide 212 is incident to the detecting device 213.

A general description will now be given of an optical relationship occurring between the edge receiving type image detecting unit and the surface of the document.

The edge receiving type image detecting unit is a type of to the optical sensor. The resolving power of an optical sensor is influenced by the distance between the document and the optical sensor, so that the smaller the distance is between the document and the optical sensor, the better the resolving power of the optical sensor. A greater resolving power is suitable for accurately detecting images. However, when the distance between the document and the optical sensor becomes too small, it is necessary to control accurately the position of the document with respect to the optical sensor, and the amount of the light incident to the optical sensor decreases. Thus, it is generally suitable that MTF, which represents the degree of the resolving power of the optical sensor, be equal to or greater than 50, and more suitable that MTF be equal to or greater than 55.

When the density of detecting devices used for the optical sensor increases, it is necessary for the distance between the document and the optical sensor to be decreased to keep MTF in a constant value (50 or 55). That is, there is an inverse proportional relationship between the density of the detecting devices of the optical sensor and the distance between the document and the optical sensor. In the edge receiving type image detecting unit, when an incident angle of a light beam with respect to the end surface 214 of the optical waveguide 212 is less than the critical angle which is determined by refraction indexes of the core layer and the clad layer, the light incident to the optical waveguide is transmitted through the optical waveguide. Therefore, the relationship between the resolving power and the distance between the document and the optical sensor is influenced by the critical angle. When the density of the detecting devices of the optical sensor is large, the resolving power of the optical sensor greatly changes in accordance with changes of the distance between the document and the optical sensor. Thus, it is necessary to determine quantitatively the relationship, which gives the required MTF, between the density of the detecting devices of the optical sensor and the distance between the document and the optical sensor.

After the distance between the document and the optical sensor is determined, it is necessary to optimize an incident condition of the light incident on the surface of the document to obtain a sufficient amount of the light. Thus, it is necessary for the light beam incident on the surface of the document to be thin.

In addition, to use efficiently the light incident on the surface of the document for detecting images, it is necessary to optimize the incident angle of the light incident on the surface of the document. The incident angle is defined as the angle between the light and the normal direction of the surface of the document. It is necessary for the optimum incident angle to increase as the distance between the document and the optical sensor becomes smaller. It is also necessary for the optimum incident angle to decrease as the distance between the document and the optical sensor becomes larger. But, the light incident on the surface of the document is irregularly reflected so that the optimum angle differs from an angle which is geometrically determined. The optimum incident angle of the light incident on the surface of the document is a function of the distance between the document and the optical sensor. Thus, it is necessary to determine quantitatively the relationship between the optimum incident angle and the distance between the document and the optical sensor.

Therefore, in this embodiment regarding the edge receiving image detecting unit, as shown in FIG. 1, the relationship between a dot density and a document-sensor distance and the relationship between the document-sensor distance and the optimum incident angle of the light incident on the surface of the document are quantitatively obtained by computer calculations. That is, the computer calculates refraction indexes, the document-sensor distance, the amount of the light detected by the detecting device, MTF and so on, and then the relationships described above are obtained by use of the calculation results. In this case, the dot density is defined as the number of detecting devices of the light receiving system in a predetermined length, and the document-sensor distance is defined as the distance between the surface of the document and the end surface of the optical waveguide of the light receiving system. After the operations in the computer are completed, the edge receiving type image detecting unit is made, and various characteristics of the edge receiving type image detecting unit are measured. Then, the above relationships obtained by the calculation and the results of the measurements are compared with each other.

Successive descriptions will now be successively given of the calculations.

First, a required document-sensor distance (L) in a condition where MTF is equal to 55 is calculated.

In a condition where the dot density of the light receiving system is 32 dot/mm, MTF is calculated while the refraction index and the document-sensor distance are respectively changed.

Figure 2:
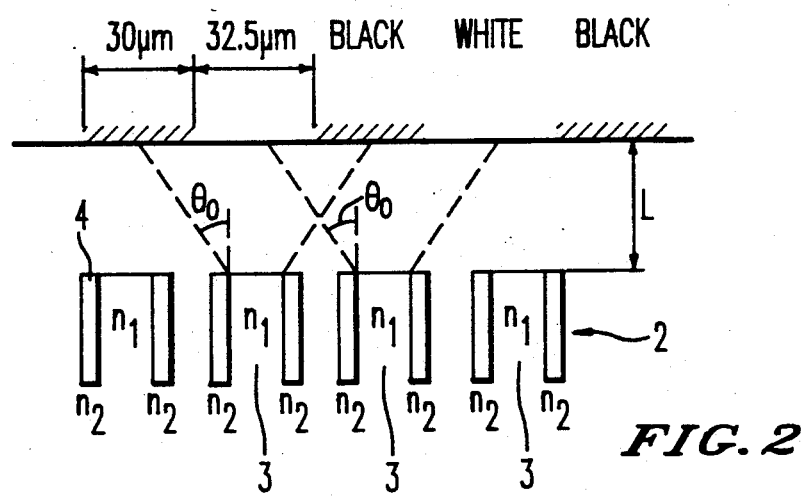
FIG. 2 is a plan view showing an example of the arrangement of the optical waveguides.

A state as shown in FIG. 2 will now be considered. Referring to FIG. 2, white lines and black lines are alternately arranged on the surface of the document 1. The length of each of the white and black lines is infinite. The width of each white line is 32.5 $\mu$m, and the width of each black line is 30.0 $\mu$m. Each line extends in a direction perpendicular to the sheet of FIG. 2. The light incident on the surface of the document 1 is irregularly reflected, and an intensity distribution of the reflected light is in accordance with the cos $\Theta$ law. In a receiving system 2 of the edge receiving image detecting unit, thirty two optical waveguides 3 are arranged within a 1 mm area. That is, the number of the optical waveguides 3 within a 1 mm area corresponds to the dot density of the receiving system 2. An end surface 4 of each optical waveguide 3 is opposed to the surface of the document 1. Each optical waveguide 3 extends in a direction perpendicular to the surface of the document 1. Each optical waveguide 3 has a core layer and a clad layer surrounding the core layer. The core layer has a cross-sectional square of 20 $\mu$m $\times$ 20 $\mu$m. When the refraction index of the core layer is $n_1$ and the refraction index of the clad layer is $n_2$, the critical angle $\Theta_0$ of the optical waveguide 3 is represented as follows;

$$\sin \Theta_0 = (n_1^2 - n_2^2)^{\frac{1}{2}}.$$

When an incident angle of the light incident on the end surface 4 is less than the critical angle of the optical waveguide 3, the light incident on the end surface 4 is transmitted through the optical waveguide 3 to a photoelectric conversion device (detecting device). The photoelectric conversion device outputs a image signal corresponding to the amount of the light supplied to the photoelectric conversion device. MTF is calculated in accordance with the following formula;

$$MTF = (I_w - I_b)/(I_w + I_b) \times 100$$

where $I_w$ is a white level which is the level of the image signal output from the photoelectric conversion device when the end surface 4 of the optical waveguide 3 is opposed to the white line on the document 1, and $I_b$ is a black level which is the level of the image signal output from the photoelectric conversion device when the end surface 4 of the optical waveguide 3 is opposed to the black line. MTF calculated by the above formula represents the degree of the resolving power of the light receiving system. MTF is a number in a range between 0 and 100. The resolving power increases as MTF increases.

Examples of numerical values used for the calculation are indicated as follows.

Thickness of the optical waveguide: $d = 20$ $\mu$m
Width of the optical waveguide: $D = 20$ $\mu$m
Width of the white line: $W = 32.5$ $\mu$m
Width of the black line: $B = 30$ $\mu$m
Reflectivity on the white line: 100%
Reflectivity on the black line: 1.6% (corresponding to the ratio between the white reflectivity and the black reflectivity on a MTF test chart)
Document-sensor distance: $L = 0-100$ $\mu$m
Refraction index of the core layer: $n_1 = 1.50-1.70$
Refraction index of the clad layer: $n_2 = 1.45$ (corresponding to the refraction index of the fused quartz)

The thickness of each of the optical waveguides is the length in the direction perpendicular to the line in which the optical waveguides are arranged. The width of each of the optical waveguides is the length in a direction of the arrangement of the optical waveguides.

MTF and the amount of a white document light are respectively calculated for the document-sensor distances (L) of 0 through 100 $\mu$m and the refractions of 1.50 through 1.70 of the core layer. The amount of the white document light is defined as the amount of a light supplied via optical waveguide 3 to the photoelectric conversion device when the end surface 4 of the optical waveguide 3 is opposed to the white line on the document 1.

Figure 3:
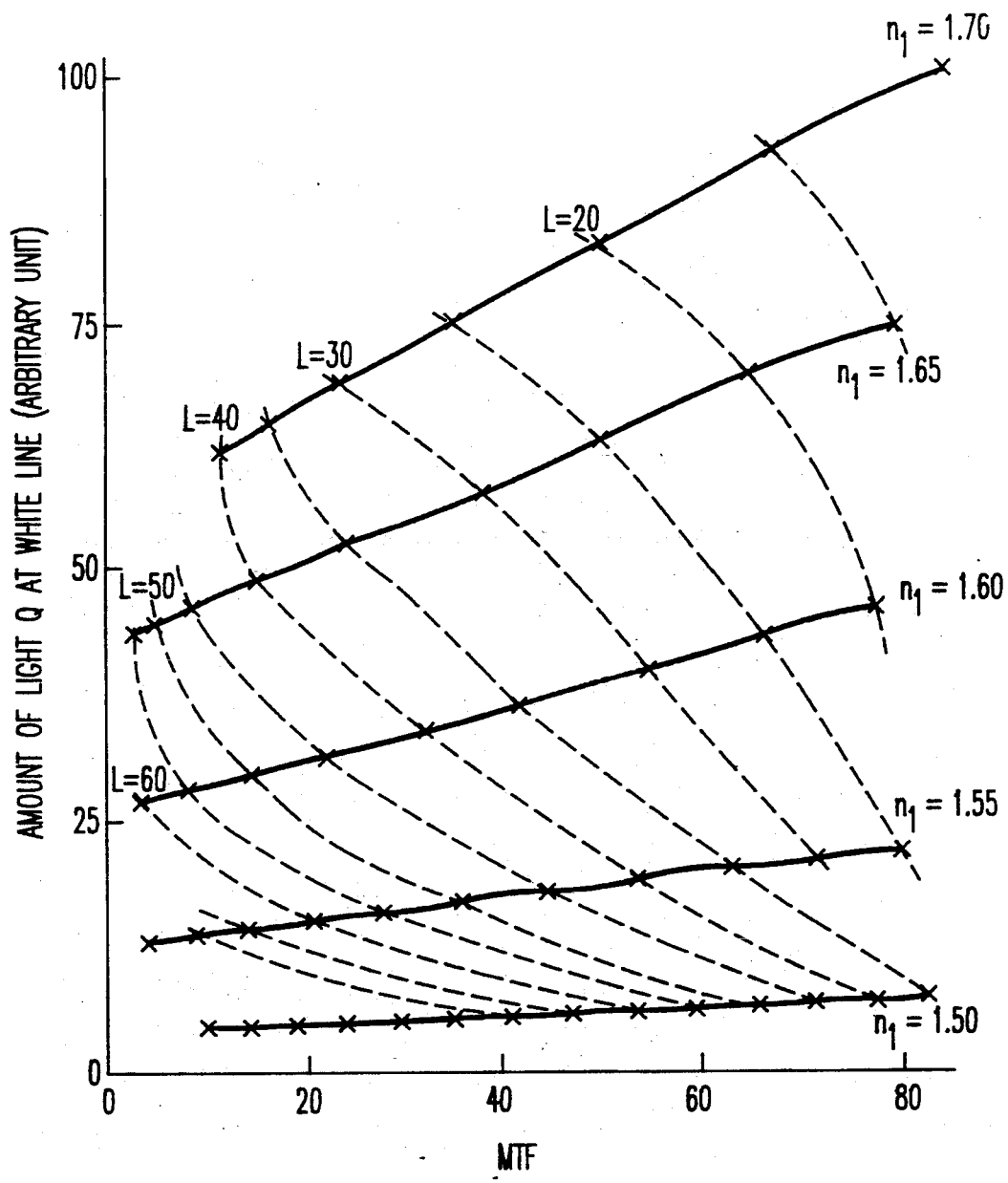
FIG. 3 is a graph illustrating the relationship between the MTF and the amount of light corresponding to the white line.

FIG. 3 is a graph showing a relationship between MTF and the amount of the white document light. In the graph shown in FIG. 3, the axis of ordinates represents the amount of white document light and the axis of abscissas represents MTF. Each solid line represents the relationship between MTF and the amount of the white document light in a case where the refraction index $n_1$ of the core layer has a constant value. Each dotted line represents the relationship between MTF and the amount of the white document light in a case where the document-sensor distance L is a constant value. Referring to the graph shown in FIG. 3, MTF decrease as the document-sensor distance L increases and MTF increases as the refraction index of the core layer decreases.

Accordingly, when the refraction index $n_1$ of the core layer and the required MTF are respectively given, the document-sensor distance L can be determined on the basis of the graph shown in FIG. 3. For example, when the refraction index $n_1$ is equal to 1.60 and the required MTF is equal to 60, it is determined that the document-sensor distance L is approximately equal to 28 $\mu$m.

An object in this above case is to obtain MTF which is equal to 55 so that the document-sensor distances corresponding to the refraction indexes of the core layer are determined as shown in Table-1. These document-sensor distances are determined on the basis of the points at which a line representing MTF=55 intersects the solid lines corresponding to the refraction indexes in the graph shown in FIG. 3.

TABLE 1

| refraction index $n_1$ | 1.50 | 1.55 | 1.60 | 1.65 | 1.70 |
|---|---|---|---|---|---|
| document-sensor distance L (μm) | 57 | 38 | 29 | 22.5 | 17.5 |

In this case, it is assumed that the dot density of the light receiving system is 32 dot/mm. In each of the cases where the dot densities are respectively 8 dot/mm, 16 dot/mm and 48 dot/mm, the amount of the white document light can be calculated in the same manner as in the case where the dot density is 32 dot/mm. Thus, the relationship between the document-sensor distance L and the dot density N is an inverse proportion. That is, the following formula holds:

$$N \times L = K \quad (1)$$

where K is a constant. The optical sensor having the dot density which is less than 8 dot/mm is not suitable for detecting a high-quality image so that N is equal to or greater than 8 in the above formula. The constant K in the above formula is obtained on the basis of the relation between the dot density N and the document-sensor distance L in the case where the dot density is 32 dot/mm. The constant number K corresponding to each refraction index $n_1$ is determined as shown in the following table:

TABLE 2

| $n_1$ | 1.50 | 1.55 | 1.60 | 1.65 | 1.70 |
|---|---|---|---|---|---|
| K | 1824 | 1216 | 929 | 720 | 560 |

The refraction index $n_2$ of the clad layer of the optical waveguide also contributes to the result shown in Table-2. Thus, the relationship between the critical angle $\theta_0$ (deg) and the constant number K is generally obtained as shown in Table-3 below. The critical angle $\theta_0$ is represented by the following formula:

$$\sin \theta_0 = (n_1^2 - n_2^2)^{\frac{1}{2}}$$

where $n_1$ represents the refraction index of the core layer and $n_2$ represents the refraction index of the clad layer.

TABLE 3

| $\theta_0$ | 22.6 | 33.2 | 42.6 | 51.9 | 62.5 |
|---|---|---|---|---|---|
| K | 1824 | 1216 | 929 | 720 | 560 |

The constant number K decreases as the critical angle $\theta_0$ increases so that the constant number is approximately represented by the following formula:

$$K = (14800/\theta_0)^{1.16} \quad (2)$$

The document-sensor distance L is calculated by means of the above formulas (1) and (2) in the case where MTF is equal to 55. Large MTF is suitable for detecting the image so that the document-sensor distance L actually determined may be equal to or less than that determined by means of the formulas (1) and (2). In addition, the document-sensor distance L is so determined that no deterioration of the signal-to-noise ratio in the image signal from the photoelectric conversion device occurs.

Next, in the case where the document-sensor distance L is determined, the incident angle $\phi$ of the light incident on the surface of the document 1 will be calculated.

Figure 4:
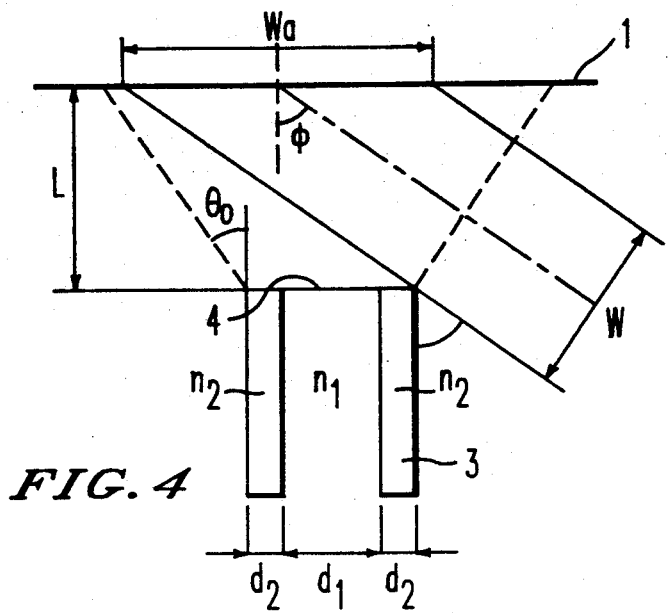
FIG. 4 is a diagram illustrating the incident angle of the light incident onto the surface of the document.

Referring to FIG. 4, the diameter of the light beam emitted from the light emitting system is represented by W, and the light beam is incident on the surface of the document 1 in a angle $\phi$ with respect to the normal direction of the surface of the document 1. That is, the incident angle of the light beam is represented by $\phi$. The light beam is irregularly reflected by the surface of the document 1 in accordance with cos $\theta$ law. The refraction index, the thickness and the width of the core layer of the optical waveguide 3 are respectively represented by $n_1$, $d_1$ and D. The refraction index, the thickness and the width of the clad layer of the optical waveguide are respectively represented by $n_2$, $d_2$ and $D+2d_2$. Then, the amount of an incident light which is the amount of the light supplied through the optical waveguide to the photoelectric conversion device is calculated under the following conditions:

Thickness of the core layer: $d_1 = 20$ μm
Width of the core layer: $D = 20$ μm
Refraction index of the core layer: $n_1 = 1.50$–1.70
Thickness of the clad layer: $d_2 = 5$ μm
Refraction index of the clad layer: $n_2 = 1.45$
Document-sensor distance: $L = 0$–100 μm
Diameter of the light beam: $W = 10$ μm–1 mm
Incident angle: $\phi = 0$–85 deg.

The amount of the light is calculated for 0 through 100 μm of the document-sensor distance L and 10 μm through 1 mm of the diameter of the light beam.

Figure 5:
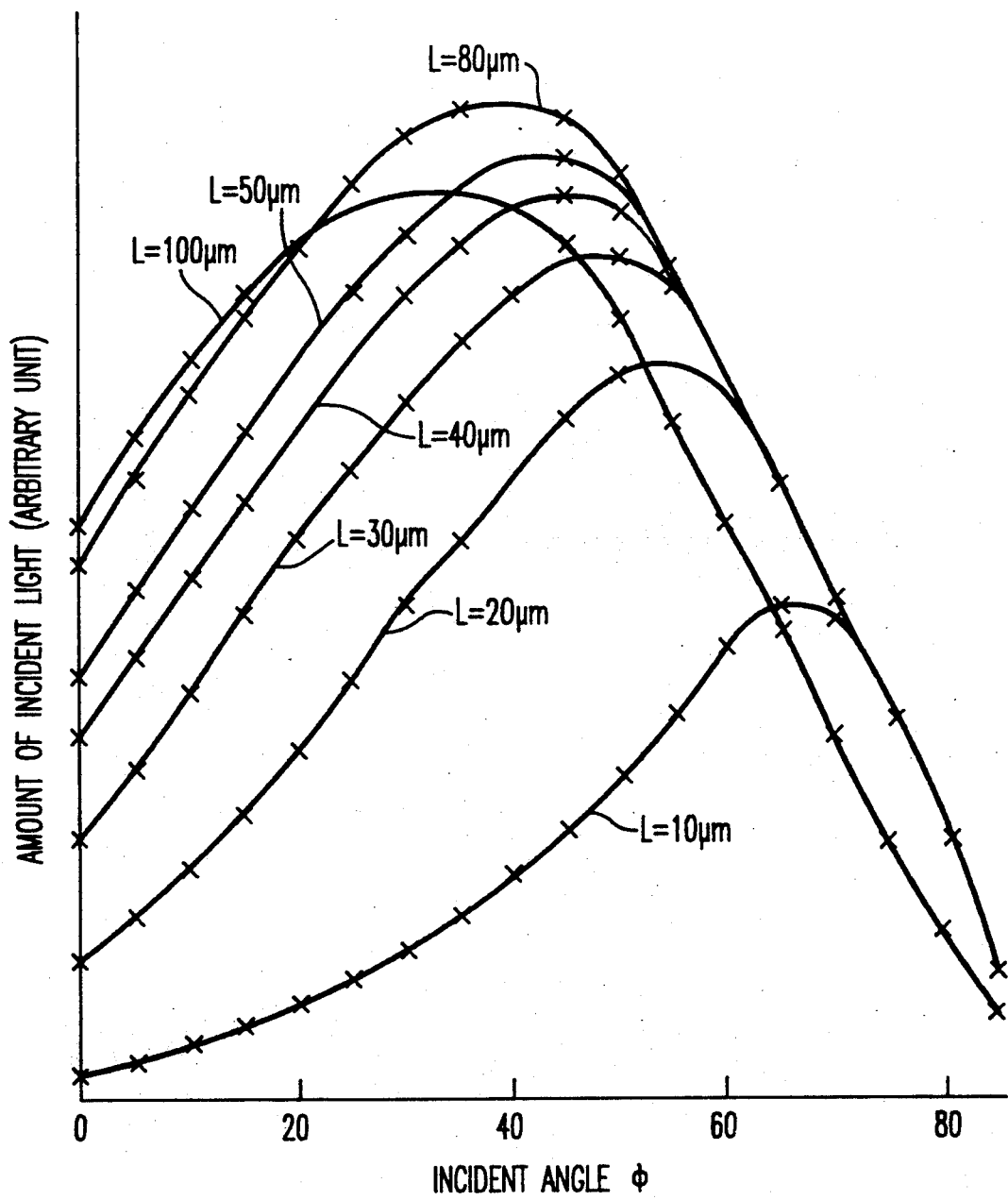
FIG. 5 is a graph illustrating the relationship between the incident angle and the amount of incident light.

FIG. 5 is a graph illustrating the relationship between the incident angle $\phi$ and the amount of the incident light Q for the parameter of the document-sensor distance L, in a case where the refraction index $n_1$ of the corer layer is equal to 1.60 and the diameter W of the light beam is equal to 100 μm. Referring to FIG. 5, the amount of the incident light Q has a peak value at an angle $\phi_0$. The peak position of the amount of the incident light Q is shifted toward the lower side of the incident angle as the document-sensor distance increases. That is, it is necessary to provide a large incident angle when the document-sensor distance L is small. The incident angle at which the amount of the incident light becomes a peak value is determined as an optimum incident angle $\phi$.

The optimum incident angle $\phi$ for other refraction indexes of the core layer can be determined in the same manner as in the case of the refraction index of 1.60 as described above. The optimum incident angle $\phi$ (deg) determined by the document-sensor distance L (μm) and the refraction index $n_1$ of the core layer is indicated in the following table:

TABLE 4

| | $n_1$ | | | | |
|---|---|---|---|---|---|
| L | 1.50 | 1.55 | 1.60 | 1.65 | 1.70 |
| 10 | 67 | 67 | 67 | 67 | 67 |
| 20 | 52 | 53 | 54 | 54 | 53 |
| 30 | 44 | 47 | 48 | 48 | 46 |
| 40 | 40 | 43 | 45 | 44 | 43 |
| 50 | 37 | 41 | 43 | 42 | 41 |
| 60 | 35 | 40 | 42 | 40 | 40 |
| 70 | 33 | 39 | 41 | 39 | 38 |
| 80 | 32 | 38 | 39 | 37 | 37 |
| 90 | 31 | 37 | 35 | 35 | 35 |

TABLE 4-continued

| L | $n_1$ | | | | |
|---|---|---|---|---|---|
| | 1.50 | 1.55 | 1.60 | 1.65 | 1.70 |
| 100 | 30 | 36 | 33 | 33 | 33 |

Referring to Table-4, the optimum incident angle $\phi$ becomes a peak value when the refraction index $n_1$ is approximately 1.60.

It is assumed that the optimum incident angle is approximately represented by the following function of the document-sensor distance L.

$$\phi = P - Q \ln L \quad (3)$$

P and Q for various refraction indexes of the core layer (generally for various critical angles) are determined as shown in the following table:

TABLE 5

| $n_1$ | 1.50 | 1.55 | 1.60 | 1.65 | 1.70 |
|---|---|---|---|---|---|
| $\theta_0$ | 22.6 | 33.2 | 42.6 | 51.9 | 62.5 |
| P | 101 | 96.2 | 93.8 | 93.8 | 96.7 |
| Q | 16.0 | 13.7 | 12.6 | 12.8 | 14.2 |

P and Q are respectively represented as functions of the critical angle $\theta_0$. Both functions are approximated by the parabola functions. Each of the parabola functions has a peak value at the critical angle $\theta_0$ of 45°. That is, P and Q are respectively represented by the following formulas:

$$P = 0.012(\theta_0 - 47)^2 + 93.5 \quad (4)$$

$$Q = 0.06(\theta_0 - 47)^2 + 12.5 \quad (5)$$

The optimum incident angle $\phi$ at which the maximum value of the amount of the incident light is obtained can be determined in accordance with the above formulas (3) (4) and (5).

When the incident angle of the light beam emitted from the light emitting system changes, a deviation of the amount of the incident light occurs. A description will now be given of the deviation of the amount of the incident light.

The deviation of the amount of the incident light in a case where the incident angle changes in a range between $-20°$ and $+20°$ is determined as shown in Table-6. In this case, the refraction index $n_1$ is equal to 1.60, and the document-sensor distance L is changed in a range between 10 μm and 100 μm.

The maximum amounts of incident light is set forth in the following table:

TABLE 6

| L | 10 | 20 | 30 | 40 | 50 | 60 | 70 | 80 | 90 | 100 |
|---|---|---|---|---|---|---|---|---|---|---|
| $\phi_0$ | 67 | 54 | 48 | 45 | 43 | 42 | 40 | 37 | 35 | 33 |
| $Q_m$ | 1.00 | 1.50 | 1.73 | 1.86 | 1.93 | 1.98 | 2.02 | 2.04 | 1.98 | 1.86 |
| +20° | 0.23 | 0.55 | 0.72 | 0.74 | 0.75 | 0.75 | 0.77 | 0.79 | 0.80 | 0.80 |
| +15° | 0.41 | 0.71 | 0.78 | 0.80 | 0.81 | 0.81 | 0.84 | 0.87 | 0.89 | 0.90 |
| +10° | 0.67 | 0.86 | 0.90 | 0.91 | 0.92 | 0.94 | 0.94 | 0.95 | 0.96 | 0.96 |
| +5° | 0.91 | 0.97 | 0.98 | 0.98 | 0.98 | 0.99 | 0.99 | 0.99 | 0.99 | 0.99 |
| ΔQ | | | | | | | | | | |
| -5° | 0.95 | 0.97 | 0.98 | 0.98 | 0.99 | 0.99 | 0.99 | 0.99 | 0.99 | 0.99 |
| -10° | 0.84 | 0.91 | 0.93 | 0.95 | 0.95 | 0.96 | 0.95 | 0.95 | 0.95 | 0.96 |
| -15° | 0.71 | 0.83 | 0.87 | 0.89 | 0.90 | 0.91 | 0.90 | 0.90 | 0.90 | 0.92 |
| -20° | 0.54 | 0.72 | 0.75 | 0.77 | 0.78 | 0.79 | 0.80 | 0.82 | 0.83 | 0.84 |

In Table-6, the maximum amount of the incident light $Q_m$ in a case where the document-sensor distance of 10 μm is determined as a reference value is shown. The maximum amount of the incident light $Q_m$ corresponding to each document-sensor distance is represented as a relative value with respect to the maximum amount of the incident light in the case where the document-sensor distance is equal to 10 μm. The deviation ΔQ of the amount of the incident light is represented as a relative value with respect to the maximum amount of the incident light $Q_m$.

Referring to Table-6 and FIG. 5, a rate of change of the amount of the incident light in a case where the incident angle increases from the optimum incident angle is greater than a rate of change of the amount of the incident light in a case where the incident angle decreases from the optimum incident angle. In addition, a small change in the amount of the incident light is obtained when the document-sensor distance L is large. That is, in a case where the document-sensor distance is large, even if the incident angle changes from the optimum incident angle $\phi_0$, the amount of the incident light decreases a little.

It is assumed that the amount of the incident light required is 60% of the maximum amount of the incident light $Q_m$. Under this condition, the permitted deviation ΔQ of the incident angle is in a range between $+13°$ and $-18°$ when the document-sensor distance L is equal to 10 μm. When the document-sensor distance is equal to 10 μm, a high-density light receiving system, in which the dot density is 96 dot/mm to obtain 55 of MTF, is required. However, the high-density light receiving system in which the dot density is 96 dot/mm is generally not used. In addition, it is difficult to maintain the document-sensor distance of 10 μm. Actually, the document-sensor distance is determined as being a value equal to or greater than 20 μm.

As a result of the above, the deviation of the incident angle is determined as being in a range between $+18°$ and $-25°$. This range between $+18°$ and $-25°$ is a range which is permitted in a case where the document-sensor distance is 20 μm. In this case, the refraction index $n_1$ of the core layer is 1.60. In the case of another refraction index $n_1$, the same result is obtained as in the case where the refraction index $n_1$ of the core layer is 1.60. That is, even if the incident angle changes from the optimum incident angle $\phi_0$ in the range between $+18°$ and $-25°$, the amount of the incident light which is 60% of the maximum amount of the incident light is maintained for the document-sensor distance equal to or greater than 20 μm.

A principal axis of the light beam extends through a point where the intensity distribution in the light beam spot is the maximum. In more detail, the incident angle is defined as an angle between the principal axis of the light beam and the normal direction of the surface of the document.

A description will now be given of a direction in which the optical waveguide 3 of the light receiving system extends.

Figure 6:
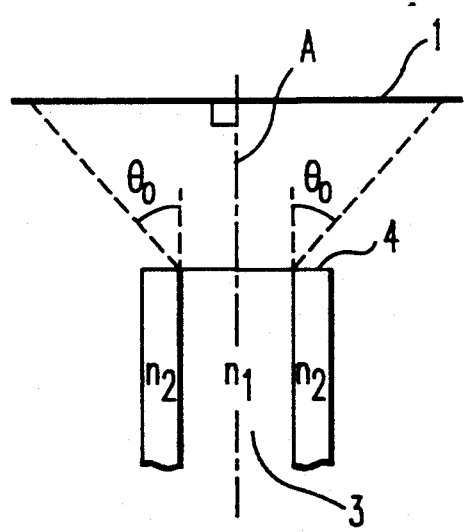
FIG. 6 is a diagram illustrating the optical waveguide provided so that the center axis of the optical waveguide is perpendicular to the surface of the document.

The optical waveguide 3 has the core layer ($n_1$) and a clad layer ($n_2$) surrounding the core layer. That is, a cross section of the optical waveguide 3 has three layers so that the core layer is put between two clad layers. In a case where the optical waveguide 3 is provided so as to extend in a direction perpendicular to the surface of the document 1, as shown in FIG. 6, a light incident on the end surface 4 in a angle $\theta$ in a range of $-\theta_0 < \theta < \theta_0$ can be transmitted through the optical waveguide 3. That is, a permitted angle range ($-\theta_0 < \theta < \theta_0$) of the light incident on the end surface 4 of the optical waveguide 3 is symmetrically formed in a direction perpendicular to the end surface 4. $\theta_0$ represents the critical angle of the optical waveguide 3, and the critical angle $\theta_0$ is determined by the following formula:

$$\sin \theta_0 = (n_1^2 - n_2^2)^{\frac{1}{2}}$$

Figure 7:
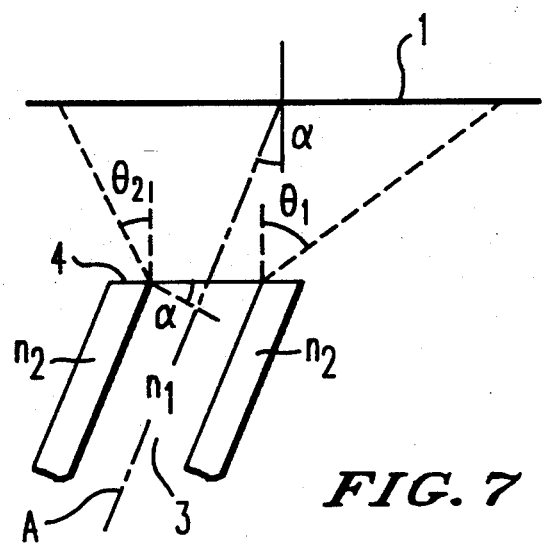
FIG. 7 is a diagram illustrating the optical waveguide provided so that the angle between the center axis of the optical waveguide and the surface of the document is equal to $\alpha$.

On the other hand, FIG. 7 shows the optical waveguide 3 which is inclined with respect to the surface of the document 1. The optical waveguide 3 is also inclined with respect to the end surface 4 of the optical waveguide 3. An angle between a center axis of the optical waveguide 3 and the normal direction of the surface of the document 1 is $\alpha$. An angle between the center axis of the optical waveguide 3 and the normal direction of the end surface 4 of the optical waveguide 3 is also $\alpha$. This angle is termed a taper angle $\alpha$. The end surface 4 of the optical waveguide 3 and the surface of the document 1 are parallel to each other. In the case of the taper angle $\alpha$, as shown in FIG. 7, a light incident on the end surface 4 in an angle $\theta$ in a range of $-\theta_2 < \theta < \theta_1$ can be transmitted through the optical waveguide 3. The following inequality regarding the angle $\theta$ holds:

$$-\cos \alpha (n_1^2 - n_2^2)^{\frac{1}{2}} + n_2 \sin \alpha \leq \sin \theta \leq \cos \alpha (n_1^2 - n_2^2)^{\frac{1}{2}} + n_2 \sin \alpha$$

$\theta_1$ is called an upper limit angle and $\theta_2$ is called a lower limit angle. As shown below, both the upper limit angle $\theta_1$ and the lower limit angle $\theta_2$ are respectively determined on the basis of the above inequality.

$$\theta_1 = \sin^{-1}[\cos \alpha (n_1^2 - n_2^2)^{\frac{1}{2}} + n_2 \sin \alpha]$$

$$\theta_2 = \sin^{-1}[-\cos \alpha (n_1^2 - n_2^2)^{\frac{1}{2}} + n_2 \sin \alpha]$$

The permitted angle range of the light incident on the end surface 4 of the optical waveguide 3 is asymmetrically formed in a direction perpendicular to the end surface 4. Values of the upper limit angle $\theta_1$ and the lower limit angle $\theta_2$ corresponding to the taper angle $\alpha(°)$ are indicated in the following table:

TABLE 7

| $\alpha$ | | 1.50 | 1.55 | $n_1$ 1.60 | 1.65 | 1.70 |
|---|---|---|---|---|---|---|
| 0 | $\theta_1$ | 22.58 | 33.21 | 42.56 | 51.94 | 62.54 |
|   | $\theta_2$ | −22.58 | −33.21 | −42.56 | −51.94 | −62.54 |
| 5 | $\theta_1$ | 30.59 | 42.22 | 53.14 | 65.61 | 90.00 |
|   | $\theta_2$ | −14.84 | −24.78 | −33.19 | −41.14 | −49.25 |
| 10 | $\theta_1$ | 39.05 | 52.29 | 66.62 | 90.00 | 90.00 |
|   | $\theta_2$ | −7.26 | −16.71 | −24.47 | −31.57 | −38.47 |
| 15 | $\theta_1$ | 48.26 | 64.73 | 90.00 | 90.00 | 90.00 |
|   | $\theta_2$ | 0.24 | −8.84 | −16.14 | −22.66 | −28.80 |
| 20 | $\theta_1$ | 58.96 | 90.00 | 90.00 | 90.00 | 90.00 |
|   | $\theta_2$ | 7.76 | −1.07 | −8.02 | −14.12 | −19.75 |
| 25 | $\theta_1$ | 73.91 | 90.00 | 90.00 | 90.00 | 90.00 |

TABLE 7-continued

| $\alpha$ | | 1.50 | 1.55 | $n_1$ 1.60 | 1.65 | 1.70 |
|---|---|---|---|---|---|---|
|   | $\theta_2$ | 15.35 | 6.68 | −0.01 | −5.78 | −11.03 |

The results shown in Table-7 are calculated under a condition where the refraction index $n_2$ of the clad layer is 1.45.

Referring to Table-7, the upper limit angle $\theta_1$ increases and the lower limit angle $\theta_2$ decreases as the taper angle $\alpha$ increases so that it can be considered that the optimum incident angle $\phi_0$ decreases as the taper angle $\alpha$ increases. When the incident angle $\phi$ becomes small, the substantial diameter Wa of the light beam spot becomes small (Wa = W/cos $\phi$, referring to FIG. 4). The amount of the light incident to the optical waveguide 3 increases when the substantial diameter Wa of the light beam spot decreases.

Figure 8:
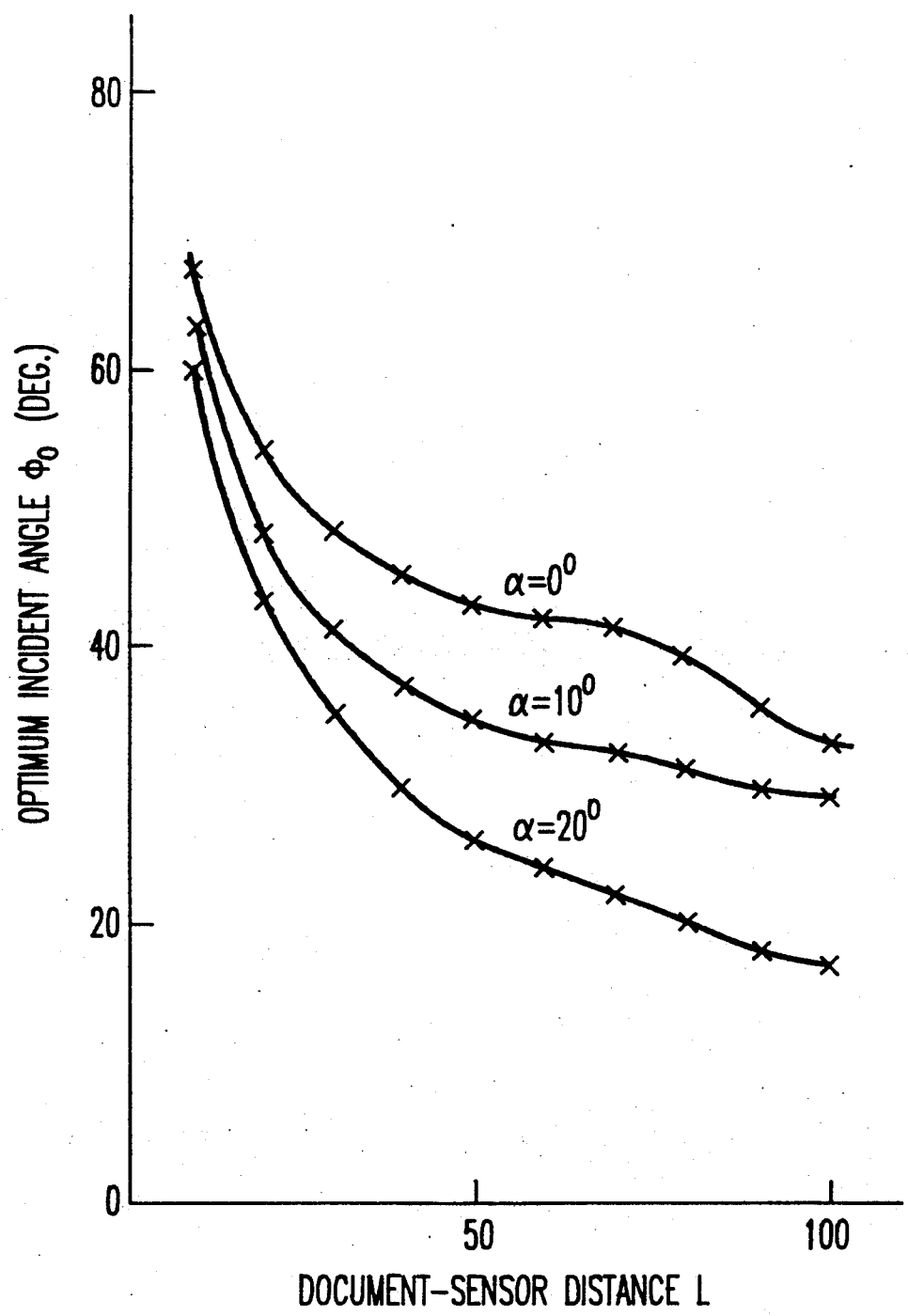
FIG. 8 is a graph illustrating the relationship between the document-sensor distance L and the optimum incident angle.
Figure 9:
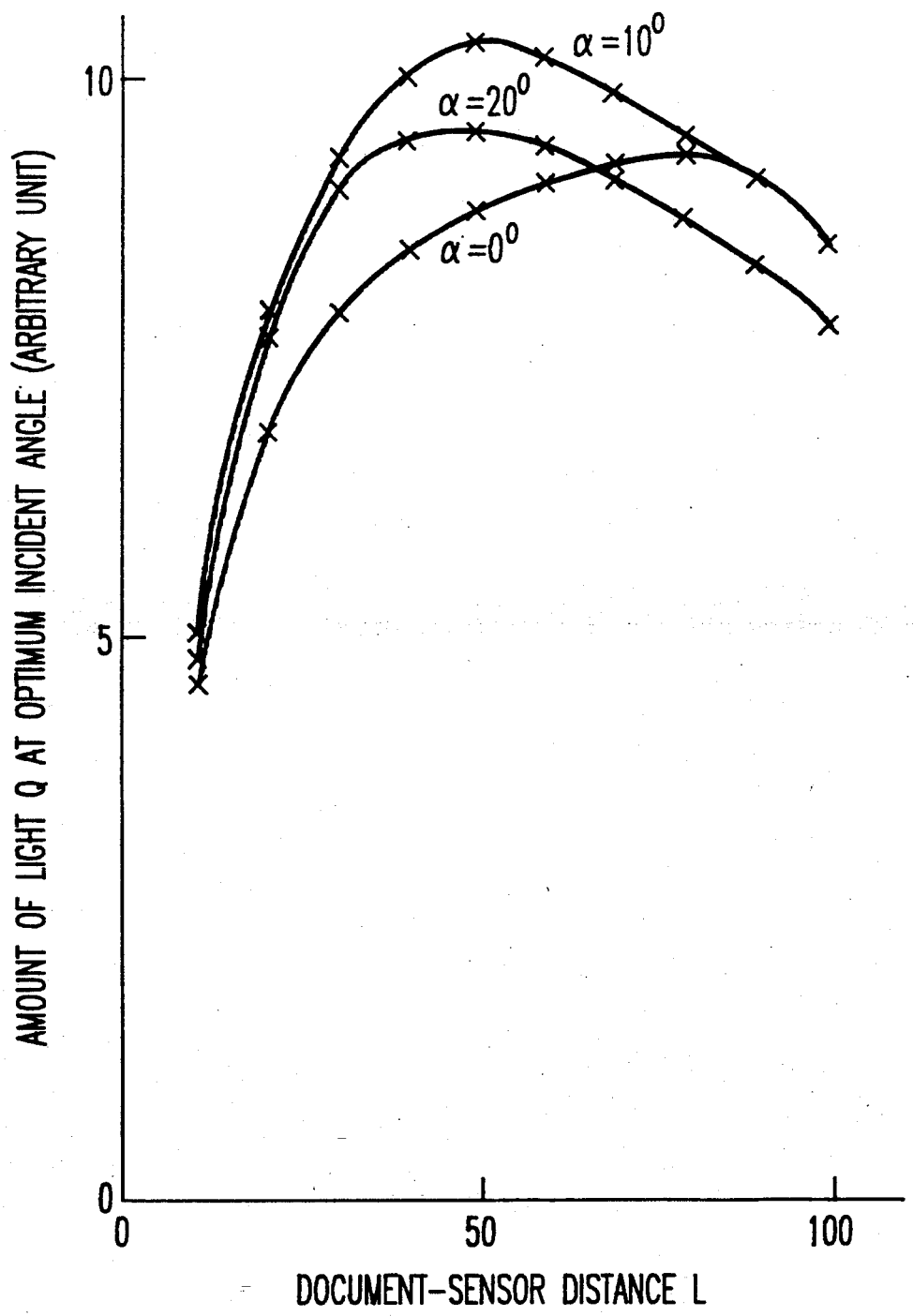
FIG. 9 is a graph illustrating the relationship between the document-sensor distance L and the amount of incident light at the optimum incident angle.

The optimum incident angle $\phi_0$ and the maximum amount of the light $Q_m$ corresponding to the taper angle $\alpha$ are calculated. The calculation is performed in accordance with the same procedure as that of the case described above, under a condition where the upper limit angle $\theta_1$ differs from the lower limit angle $\theta_2$. The results of the calculation of the optimum incident angle $\phi_0$ and the maximum amount of the light $Q_m$ are indicated in Table-8. In this case, the refraction index $n_1$ is equal to 1.60. In addition the calculation results are also shown in FIGS. 8 and 9. The following table sets forth the maximum amount of light $Q_m$:

TABLE 8

| L | 0 | 5 | $\alpha$ 10 | 15 | 20 |
|---|---|---|---|---|---|
| 10 | 67(4.56) | 65(4.81) | 63(5.04) | 61(5.12) | 60(4.79) |
| 20 | 54(6.85) | 51(7.41) | 48(7.92) | 45(8.12) | 43(7.74) |
| 30 | 48(7.91) | 44(8.64) | 41(9.29) | 38(9.40) | 35(9.00) |
| 40 | 45(8.47) | 41(9.31) | 37(10.04) | 33(9.90) | 30(9.47) |
| 50 | 43(8.81) | 39(9.71) | 35(10.33) | 31(10.00) | 26(9.54) |
| 60 | 42(9.05) | 38(9.99) | 33(10.19) | 28(9.86) | 24(9.39) |
| 70 | 41(9.21) | 37(10.00) | 32(9.89) | 27(9.57) | 22(9.10) |
| 80 | 39(9.32) | 36(9.58) | 31(9.48) | 25(9.20) | 20(8.75) |
| 90 | 35(9.03) | 35(9.06) | 29(9.02) | 24(8.78) | 18(8.36) |
| 100 | 33(8.50) | 33(8.53) | 28(8.53) | 23(8.74) | 17(7.79) |

In Table-8, each number in a parenthesis represents the maximum amount of light $Q_m$, and the document-sensor distance L is represented by use of $\mu$m.

Referring to Table-8, the optimum incident angle $\phi_0$ decreases and the maximum amount of light $Q_m$ increases as the taper angle $\alpha$ increases. However, when the taper angle $\alpha$ is too large, the maximum amount of light $Q_m$ becomes small since the lower limit angle $\theta_2$ also becomes large, as shown in Table-7, as the taper angle $\alpha$ becomes large. That is, it is considered that an incident angle $\theta$ of a part of the light reflected on an area, on the surface of the document 1, just opposite to the end surface 4 of the optical waveguide 3, is less than the lower limit angle $\theta_2$ when the lower limit angle $\theta_2$ becomes large. The light incident on the end surface 4 in an incident angle less than the lower limit angle $\theta_2$ can not be transmitted through the optical waveguide 3.

For example, when the taper angle $\alpha$ is equal to 10° and the document-sensor distance L is in a range between 20 $\mu$m and 70 $\mu$m, it is expected that a 7% or more increase of the amount of incident light will be obtained in comparison with the case where the taper angle $\alpha$ is equal to 0°. In the particular case where the document-sensor distance L is equal to 50 μm, 17% increase of the amount of incident light is obtained. When the document-sensor distance L is determined on the basis of MTF, the optimum taper angle is determined. For example, the maximum amount of incident light is obtained for 10° of the taper angle when the document-sensor distance L is equal to 50 μm, the optimum taper angle is equal to 15° when the document-sensor distance L is equal to 20 μm, and the optimum taper angle is equal to 5° when the document-sensor distance L is 70 μm. When the taper angle is equal to or greater than 20°, the amount of incident light decreases so that the optimum taper angle is not obtained in an angle equal to or greater than 20°.

Figure 10:
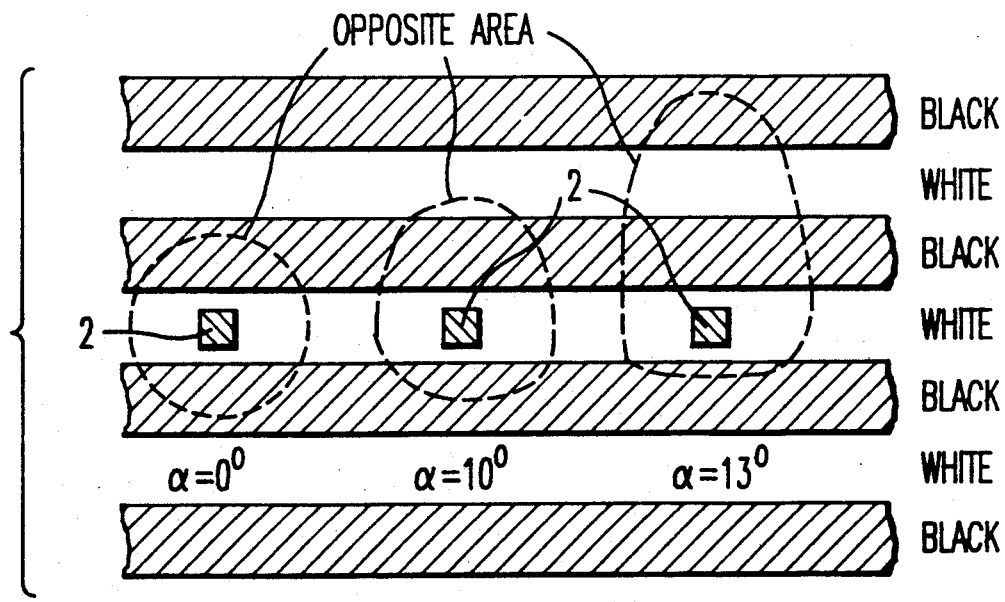
FIG. 10 is a diagram illustrating the opposite area corresponding to each taper angle.

In addition, an opposite area formed on the surface of the document 1 is extended in a sub scanning direction, as shown in FIG. 10, as the taper angle α increases. The opposite area is illustrated as an area surrounded by a dotted line in FIG. 10, and two other such opposite area are similarly indicated in the same FIG. 10. The opposite area is defined as an area, on the surface of the document 1, where the end surface 4 of the optical waveguide 3 is opposite to the doument 1 within an angle range between the upper limit angle $\theta_1$ (critical angle) and the lower limit angle $\theta_2$ (critical angle). MTF is deteriorated in the sub scanning direction as the opposite area is extended in the sub scanning direction. A degree of the deterioration of MTF can be represented by a ratio $S/S_0$ where S represents a size of an opposite area and $S_0$ represents a size of the opposite area in the case here the taper angle is equal to 0°. When the condition of $S/S_0 > 2$ is satisfied, the degree of the deterioration of MTF is too large so that it is determined that the taper angle is unsuitable.

The following Table-9 indicates the ratio $S/S_0$ for each refraction index $n_1$. In Table-9, when the upper limit angle $\theta_1$ is equal to 90°, as shown in Table-7, the ratio $S/S_0$ is infinite ($S/S_0 = \infty$).

TABLE 9

| $n_1$ | \multicolumn{10}{c}{α} |
|---|---|---|---|---|---|---|---|---|---|---|
|  | 0 | 2.5 | 5 | 7.5 | 10 | 12.5 | 15 | 17.5 | 20 | 22.5 |
| 1.50 | 1.00 | 1.01 | 1.02 | 1.05 | 1.09 | 1.15 | 2.24 | 1.38 | 1.58 | 1.96 |
| 1.55 | 1.00 | 1.01 | 1.04 | 1.09 | 1.17 | 1.31 | 1.57 | 2.26 | ∞ | ∞ |
| 1.60 | 1.00 | 1.02 | 1.07 | 1.18 | 1.42 | 2.28 | ∞ | ∞ | ∞ | ∞ |
| 1.65 | 1.00 | 1.04 | 1.18 | 1.73 | ∞ | ∞ | ∞ | ∞ | ∞ | ∞ |
| 1.70 | 1.00 | 1.15 | ∞ | ∞ | ∞ | ∞ | ∞ | ∞ | ∞ | ∞ |

When the refraction index $n_1$ is equal to 1.60, the taper angle which has a condition of $S/S_0 = 2$ is equal to 12°. The taper angle equal to or less than 20° is suitable for obtaining a sufficient amount of incident light, as has been described above. However, as MTF is an important factor for the optical sensor, the taper angle must be determined on the basis of the MFT.

Tables 10-14 indicate the taper angles $\alpha_0$ which have the condition of $S/S_0 = 2$ for various refraction indexes of the core layer and the clad layer.

TABLE 10

| $n_1$ | 1.20 | 1.25 | 1.30 | 1.35 | 1.40 | 1.45 | 1.50 |
|---|---|---|---|---|---|---|---|
| $\alpha_0$ | 32.4 | 25.4 | 19.5 | 14.3 | 9.7 | 5.5 | 1.7 |
| ($n_2 = 1.15$) | | | | | | | |

TABLE 11

| $n_1$ | 1.35 | 1.40 | 1.45 | 1.50 | 1.55 | 1.60 | 1.65 |
|---|---|---|---|---|---|---|---|
| $\alpha_0$ | 26.7 | 20.4 | 15.2 | 10.6 | 6.5 | 2.7 | 0.8 |

TABLE 11-continued ($n_2 = 1.30$)

TABLE 12

| $n_1$ | 1.50 | 1.55 | 1.60 | 1.65 | 1.75 | 1.75 |
|---|---|---|---|---|---|---|
| $\alpha_0$ | 22.7 | 16.9 | 12.1 | 7.9 | 4.1 | 0.7 |
| ($n_2 = 1.45$) | | | | | | |

TABLE 13

| $n_1$ | 1.65 | 1.70 | 1.75 | 1.80 | 1.85 | 1.90 |
|---|---|---|---|---|---|---|
| $\alpha_0$ | 19.6 | 14.2 | 9.7 | 5.8 | 2.3 | 0.9 |
| ($n_2 = 1.60$) | | | | | | |

TABLE 14

| $n_1$ | 1.80 | 1.85 | 1.90 | 1.95 | 2.00 |
|---|---|---|---|---|---|
| $\alpha_0$ | 17.2 | 12.1 | 7.9 | 4.2 | 0.9 |
| ($n_2 = 1.75$) | | | | | |

In Tables 10-14, $n_2$ represents the refraction of the clad layer.

The results shown in Tables 10-14 are converted into a graph so that the relationship between the refraction index $n_1$ and the taper angle $\alpha_0$ is obtained. The relationship between the refraction index $n_1$ of the core layer and the taper angle $\alpha_0$ is approximately dot. Containing the refraction index $n_2$, the ratio $S/S_0$ satisfies a condition where $1 < S/S_0 < 2$ when the following condition stands;

$$0 < \alpha < 38 - 120(n_1 - n_2).$$

That is, in this case, MTF is prevented from deteriorating.

When the taper angle α is determined as being an angle in the range defined by the above inequality and the incident angle φ of the light incident on the surface of the document 1 becomes smaller by 0° through 15° in comparison with the case of 0° of the taper angle α, about an 18% increase of the amount of incident light is obtained. In Table-7 through Table-9, the refraction index $n_2$ of the clad layer is equal to 1.45. In addition, it has been ascertained that a result having the same above tendency is obtained when the refraction index $n_2$ of the clad layer is equal to another value.

A description will now be given of examples of the structure of the image detecting unit suitable for obtaining the optimum incident angle $\phi_0$, with reference to FIGS. 11 and 12.

Figure 11:
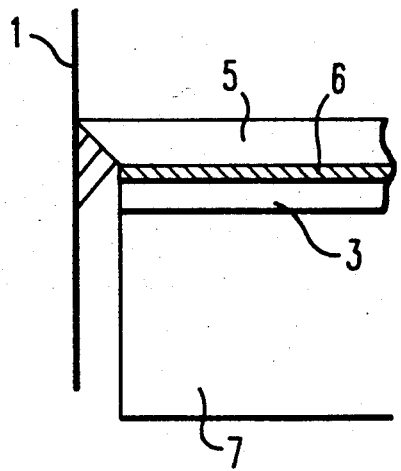
FIGS. 11 and 12 are side views showing examples of the image detecting unit in which the light emitting system and the light receiving system are integrated with each other.

Referring to FIG. 11, the optical waveguide 3 is formed on a substrate 7, and a light shield layer 6 is formed on the optical waveguide 3. In addition, a fluorescence film 5 is formed on the light shield layer 6. An end surface of the fluorescence film 5 is shaped so that the end surface is inclined with respect to the end surface of the optical waveguide and thus the light emitted from the end surface of the fluorescence film 5 is projected onto the surface of the document 1 on the opposite area of the optical waveguide 3. In the image detecting unit shown in FIG. 11, the light shield layer 6 is put between the optical waveguide 3 and the fluorescence film 5 so that the optical waveguide 3 and the fluorescence film 5 are integrated. That is, the light emitting system and the light receiving system are integrated with each other.

The light generated in the fluorescence film 5 is emitted from the end surface thereof as indicated by arrows shown in FIG. 11 so that the incident light incident on the surface of the document 1 is inclined with respect to the surface of the document 1. The image detecting unit is inclined so that the light emitted from the fluorescence film 5 is incident on the surface of the document 1 in the optimum incident angle $\phi_0$. Therefore, the taper angle of the optical waveguide 3 is determined. When the optical waveguide 3 is inclined by the taper angle, a five time increase in the light utility factor for 20 $\mu$m of the document-sensor distance, a 3.3 time increase in the light utility factor for 30 m thereof and a 2.2 time increase in the light utility factor for 50 um thereof are respectively obtained. The light utility factor is the degree of the amount of light which is operatively used for detecting the image.

Figure 12:
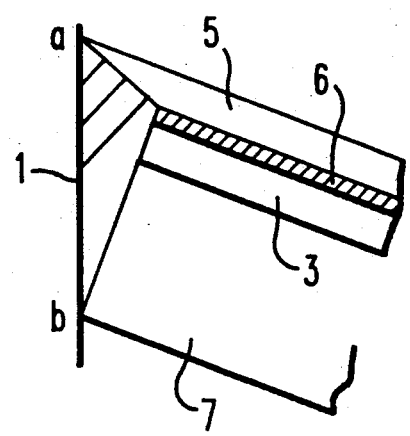

In the example shown in FIG. 11, an edge of the end surface of the fluorescence film 5 is in contact with the surface of the document 1 so that a predetermined document-sensor distance is maintained, and in FIG. 12, the end surface of the fluorescence film is inclined in a predetermined angle so that the optimum incident angle is obtained. An edge (a) of the end surface of the fluorescence film 5 and an edge (b) of the substrate 7 are respectively in contact with the surface of the document 1, as shown in FIG. 12, so that it is possible to exactly control the document-sensor distance L in a required distance.

In addition, it is possible to substitute an EL panel, having an end surface from which the light is emitted, for the fluorescence film 5.

Next, a description will be given of a first embodiment of the light receiving system of the image detecting unit with reference to FIG. 13.

Figure 13:
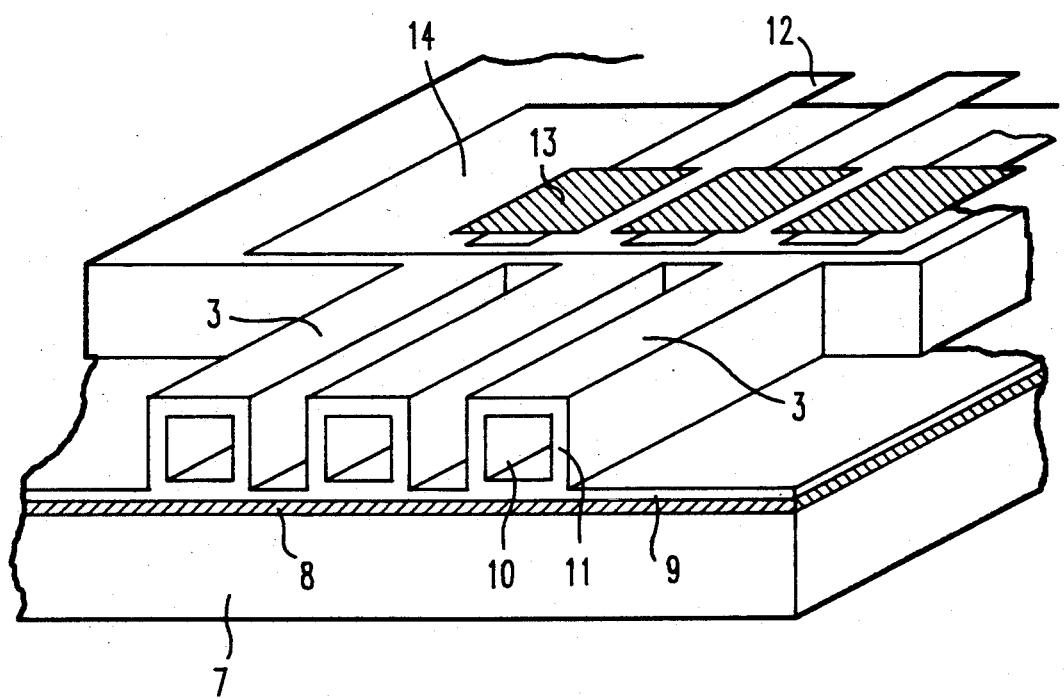
FIG. 13 is a perspective view illustrating the light receiving system.

The light receiving system as shown in FIG. 13 is, for example, made in accordance with the following process.

Referring to FIG. 13, the substrate 7 is made of pylex glass. The thickness of the substrate 7 is equal to 1 mm. The light shield layer 8 made of Cr is formed on the substrate 7 by spattering. The thickness of the light shield layer 8 is equal to 1000 Å. The light shield layer 8 prevents stray light from being incident to the photoelectric conversion device. The spattering process for forming the light shield layer 8 is, for example, performed under conditions in which the substrate temperature is equal to 80° C., Ar gas pressure is equal to 5 mTorr and RF power is 2W/cm².

A chromium oxide film 9 is formed on the light shield layer 8 by spattering. The thickness of the chromium oxide is equal to 300 Å. The spattering for forming the chromium oxide film 9 is performed under conditions in which the substrate temperature is equal to 80° C., Ar gas pressure is equal to 2 mTorr and RF power is equal to 2W/cm². The chromium oxide film 9 makes the reflectance of the light shield layer 8 decrease so that it is possible to prevent the light coming out from the core layer 10 through clad layer 11 from being incident, as a stray light, to the photoelectric conversion device.

Then, a SiON film used for the optical waveguide 3 having the core layer 10 and the clad layer 11 is formed on the chromium oxide film 9 by the RF plasma CVD process. In the process of forming the optical waveguide 3, first the clad layer 11 is formed and then the core layer 10 is formed. The thickness of the clad layer 10 is equal to 5 $\mu$m. Material gas, which includes silane ($SiH_4$), nitrogen ($N_2$) and carbon dioxide ($CO_2$), is used for forming the clad layer 11. The composition ratio of the material gas is $SiH_4:N_2:CO_2 = 1:23:77$. In this case, the substrate temperature is equal to 200° C., RF power is equal to 100 mw/cm² and the gas pressure is equal to 1 Torr. Under the above condition, the clad layer 11 whose refraction index is 1.45 is formed. After this, five kinds of core layers having the refraction indexes which are different from each other are formed by changing the composition ratio of the material gas so that five kinds of light receiving systems are obtained. The thickness of the core layer 10 is equal to 20 um. When the composition ratio is $Si_4:N_2:CO_2 = 1:82:18$, the refraction index of 1.50 is obtained. When the composition ratio is $Si_4:N_2:CO_2 = 1:86:14$, the refraction index of 1.55 is obtained. When the composition ratio is $Si_4:N_2:CO_2 = 1:92:8$, the refraction index of 1.60 is obtained. When the composition ratio is $Si_4:N_2:CO_2 = 1:94:6$, the refraction index of 1.70 is obtained. In the process for forming the core layer 10, the conditions regarding the substrate temperature, RF power, and gas pressure have the same value as those for forming the clad layer 11.

An ITO film 12 is formed on the optical waveguide 3 by spattering. The ITO film 12 is used as an electrode which corresponds to each photoelectric conversion device 13. In the process for forming the ITO film 12, the substrate temperature is equal to 150° C., Ar gas partial pressure is equal to 2 mToor, oxide gas partial pressure is equal to 3 mToor and RF power is equal to 1W/cm². The thickness of the ITO film 12 is equal to 1800 Å. The ITO film 12 is shaped so as to be formed the electrode corresponding to each photoelectric conversion device. A first layer insulation film whose thickness is equal to 5000 Å is formed on the ITO film 12. The first layer insulation is not shown in FIG. 13. The conditions for forming the first layer insulation film are identical to those for forming the clad layer 11 as has been described above. Next, a contact hole is formed on the first layer insulation film at a position corresponding to each electrode made of the ITO film 12. Then, each of the photoelectric conversion devices 13 is formed on the first layer insulation film so as to cover a corresponding contact hole, by use of the RF plasma CVD method. Each photoelectric conversion device 13 is made of a-Si (amorphous silicon). In the process for forming the photoelectric conversion device 13, the substrate temperature is equal to 250° C., the gas pressure is equal to 1 Torr, RF power is equal to 100 mW/cm² and the composition ratio in the material gas is silane ($SH_4$):hidrogen ($H_2$) = 1:4. The thickness of the photoelectric conversion devices 13 is 1 $\mu$m. After the photoelectric conversion devices 13 are formed, a second layer insulation film whose thickness is equal to 3000 Å is formed on the photoelectric conversion devices 13 under the same condition as the first layer insulation film. The second layer insulation film is also not shown in FIG. 13.

A contact hole are formed on the second layer insulation film at a position corresponding to each photoelectric conversion device 13. A Cr film whose thickness is equal to 2000 Å is formed on the second layer insulation film so that the Cr film covers all of the contact holes. The Cr film is used for common electrode which contacts the photoelectric conversion devices 13 to each other. In the process for forming the Cr film, the substrate temperature is equal to 80° C., the Ar gas partial pressure is equal to 5 mTorr and the RF power is equal to 2W/cm². In addition, a Al film is formed on the Cr film by the vaccum evaporation method so that the reliability of the common electrode increases. In the process for forming the Al film, the substrate temperature is equal to 120° C. The thickness of the Al film is 1 μm. The common electrode having the Cr film and the Al film covers the whole surface of each photoelectric conversion device 13 so that it is possible to prevent stray light from being incident on each photoelectric conversion device 13.

After the above, the core layer 10 and the clad layer 11 are etched by use of the ECR etching method so that a plurality of the optical waveguides 3 are formed. In the process of forming the optical waveguides 3, the etching gas is CHF₃, u-wave power is equal to 500W and the grid accelerating voltage is equal to 500 v. When the width of each optical waveguide 3 is equal to 75 μm and a space width, which is the width of a space formed between two optical waveguides 3 adjacent to each other, is 50 μm, 8 dot/mm of the dot density is obtained. When the width of each optical waveguide 3 is 37.5 μm and the space width is 25 μm, 16 dot/mm of the dot density is obtained. When the width of each optical waveguide 3 is 20 μm and the space width is 11.25 μm, 32 dot/mm of the dot density is obtained. After the etching of the core layer 10 and the clad layer 11, the clad layer 11 is formed again in the same manner as that described above. Finally, the optical waveguides 3 are cut by a dicing saw and then the end surface of each optical waveguide 3 is polished by a serium pad so that the end surface of each optical waveguide 3 becomes a specular surface.

Next, MTF of the receiving system, which is made by the process as has been described above, is measured.

First, a description will be given of an outline of the MTF measurement process.

The light receiving system is fixed by a jig. A probe is put in contact with each electrode so that it is possible to detect a photo current generated in each photoelectric conversion device via the probe. The test chart having black lines and white lines is mounted, as the document, on the XYZθ stage which is moved by the micrometer. The document-sensor distance L is changed by the micrometer while the document-sensor distance is measured by use of the microscope. The light emitting system has optical fiber light guides and edges of the optical fiber light guides arranged in a plane. When the dot density of the light receiving system is equal to 8 dot/mm, 4 line pairs of the test chart are used for the document. When the dot density of the light receiving system is equal to 16 dot/mm, 8 line pairs of the test chart are used for the document. In addition, when the dot density of the light receiving system is equal to 32 dot/mm, 16 line pairs of the test chart are used for the document.

The photo current output from each photoelectric conversion device 13 is detected while the document-sensor distance L is changed. Then the MTF is calculated on the basis of a detected photo current in a case where a corresponding optical waveguide is opposed to the white line on the test chart and a detected photo current in a case where a corresponding optical waveguide is opposed to the black line on the test chart. Table-15 shows the document-sensor distance L (μm) for every dot density and every refraction index $n_1$ of the core layer when the MTF is equal to 55.

As shown in the following table:

TABLE 15

| $n_1$ | 1.50 | 1.55 | 1.60 | 1.65 | 1.70 |
|---|---|---|---|---|---|
| 8 dot/mm | 197 | 141 | 70 | 75 | 57 |
| 16 dot/mm | 102 | 67 | 46 | 42 | 31 |
| 32 dot/mm | 54 | 34 | 25 | 20 | — |

The results may be compared, in a case where the dot density is 32 dot/mm, as shown in Table-1, with the results shown above that the results shown in Table-15 are about 10% less than the results shown in Table-1. That is, the measured MTF is less than MTF calculated as has been described above. In Table-15, the relationship between the dot density and the document-sensor distance is approximately an inverse proportion. This relationship corresponds well to the results obtained by the above described calculation.

Next, a document having a white surface is substituted for the test chart. The optical fiber light guides are fixed on the θ stage and the θ stage is inclined so that the incident angle $\phi$ of the light emitted from the optical fiber light guides is changed by 1°. Then, when the photo current output from each photoelectric conversion device 13 is a maximum, the incident angle $\phi$ is determined as being the optimum incident angle $\phi_0$. The optimum angle $\phi_0$ for each document-sensor distance and each refraction index $n_1$ of the core layer is indicated in the following table.

TABLE 16

| L | 1.50 | 1.55 | 1.60 | 1.65 | 1.70 |
|---|---|---|---|---|---|
| 20 | 50 | 51 | 53 | 50 | 50 |
| 30 | 41 | 44 | 46 | 46 | 44 |
| 40 | 38 | 40 | 42 | 41 | 39 |
| 50 | 35 | 38 | 40 | 39 | 38 |
| 60 | 32 | 37 | 39 | 37 | 37 |
| 70 | 31 | 37 | 37 | 35 | 35 |
| 80 | 31 | 36 | 35 | 35 | 34 |
| 90 | 30 | 35 | 33 | 34 | 33 |
| 100 | 28 | 35 | 32 | 34 | 32 |

In a case where the document-sensor distance is 10 μm and a case where the dot density is equal to 32 dot/mm and the refraction index $n_1$ is equal to 1.70, it is difficult to control the position of the document so that it is impossible to measure the incident angle $\phi$.

When measured values indicated in Table-16 and the calculated values indicated in Table-4 are compared with each other, it is seen that the measurement values are smaller than the calculated values by 2° or 3°. However, in both the measurement values and the calculated values, the optimum incident angle, for example, rapidly changes when the document-sensor distance changes under the condition where the document-sensor distance is small. That is, the tendency of the the change of the measurement values is approximately identical to that of the calculated values. The light component regularly reflected by the surface of the document 1 is not considered in the calculated values. This is the reason why the measurement values are slightly smaller than the calculation values. In the result shown in Table-16, the dot density of the light receiving system is equal to 32 dot/mm. When the receiving system having another dot density is used, the measurement values differ from those shown in Table-16 in a range between −2° and +2°. That is, it is possible to consider that the measurement values in a case where the receiving system has another dot density is approximately identical to that shown in Table-16.

Further more, the following Table-17 shows the change of of the photo current I output from each photoelectric conversion device 13 while the incident angle of the light incident to the surface of the document is changed from the optimum incident angle $\phi_0$ in a range between −20° and +20°. In Table-17, the refraction index $n_1$ of the core layer is equal to 1.60 and the dot density of the light receiving system is equal to 32 dot/mm.

TABLE 17

| L    | 20   | 30   | 40   | 50   | 60   | 70   | 80   | 90   | 100  |
|------|------|------|------|------|------|------|------|------|------|
| $I_m$ | 3.2  | 3.5  | 4.0  | 4.1  | 4.2  | 4.3  | 4.1  | 4.0  | 3.8  |
| +20  | 0.51 | 0.64 | 0.70 | 0.71 | 0.73 | 0.75 | 0.75 | 0.76 | 0.75 |
| +15  | 0.65 | 0.71 | 0.75 | 0.77 | 0.78 | 0.80 | 0.81 | 0.80 | 0.81 |
| +10  | 0.80 | 0.85 | 0.87 | 0.89 | 0.90 | 0.92 | 0.91 | 0.92 | 0.92 |
| +5   | 0.96 | 0.95 | 0.96 | 0.96 | 0.97 | 0.96 | 0.96 | 0.98 | 0.97 |
| −5   | 0.95 | 0.95 | 0.96 | 0.95 | 0.96 | 0.95 | 0.97 | 0.97 | 0.96 |
| −10  | 0.87 | 0.90 | 0.91 | 0.92 | 0.92 | 0.93 | 0.92 | 0.93 | 0.91 |
| −15  | 0.82 | 0.82 | 0.83 | 0.82 | 0.81 | 0.82 | 0.82 | 0.84 | 0.83 |
| −20  | 0.70 | 0.74 | 0.75 | 0.76 | 0.76 | 0.78 | 0.79 | 0.80 | 0.80 |

Referring to Table-6 and Table-17, a decrease of photo current I (nA) on the basis of the change of the incident angle (°) shown in Table-17 is slightly greater than that shown in Table-6. The light component regularly reflected by the surface of the document 1 is not considered in the result shown in Table-6. This is the reason why the results shown in Table-17 slightly differ from the results shown in Table-6. However, even if the incident angle is changed from the optimum incident angle $\phi_0$ in a range between +15° and −25°, the amount of incident light is 60% of the maximum amount of incident light. Thus, even if the incident angle is changed in the range between +15° and −25°, it is possible to use the image detecting unit.

Next, a description will be given of a second embodiment of the present invention.

The light receiving system is made in accordance with the same procedure as that described in the first embodiment. The end surface of the optical waveguide is polished so that the end surface is inclined with respect to the direction in which the optical waveguide extends. That is, the taper angle does not become equal to 0°.

Four light receiving systems, in which the taper angles are respectively equal to 0°, 5°, 10° and 15°, are formed. In each light receiving system, the dot density is equal to 32 dot/mm and the refraction index $n_1$ is equal to 1.60. The photo current I (nA) for the optimum incident angle $\phi_0$ is measured in every light receiving system. The measurement results are indicated in Table-18. In Table-18, the numeral in each parenthesis represents a value of the photo current I and L represents the document-sensor distance.

In the following table:

TABLE 18

| L  | α       |         |         |         |
|----|---------|---------|---------|---------|
|    | 0       | 5       | 10      | 15      |
| 20 | 53(3.2) | 50(3.3) | 46(3.6) | 43(3.5) |
| 30 | 46(3.5) | 42(3.9) | 38(4.2) | 33(3.5) |
| 40 | 42(4.0) | 40(4.3) | 35(4.6) | 31(4.4) |
| 50 | 40(4.1) | 38(4.4) | 33(4.7) | 28(4.5) |
| 60 | 39(4.2) | 36(4.5) | 31(4.6) | 26(4.5) |

TABLE 18-continued

| L   | α       |         |         |         |
|-----|---------|---------|---------|---------|
|     | 0       | 5       | 10      | 15      |
| 70  | 37(4.3) | 35(4.5) | 30(4.5) | 24(4.4) |
| 80  | 35(4.1) | 34(4.3) | 28(4.2) | 23(4.1) |
| 90  | 33(4.0) | 33(4.1) | 27(4.1) | 22(3.9) |
| 100 | 32(3.8) | 32(4.0) | 27(3.9) | 22(3.7) |

A comparison between this Table 18 and Table 8, has, the optimum incident angle $\phi_0$ and the photo current I indicated in Table-18 correspond in to those indicated in Table-8. About a maximum increase of 15% in the photo current is obtained, as shown the the results indicated in Table-18. Referring to Table-18, a taper angle of approximately 10° is suitable when the document-sensor distance L is in a range between 20 μm and 70 μm, and a taper angle of approximately 5° is suitable when the document-sensor distance L is in a range between 70 μm and 100 μm.

On the other hand, MTF in the sub scanning direction decreases due to the taper angle α, as described with reference to Table-9. Thus, the test chart having white lines and black lines is rotated by 90°, and then MTF of the light receiving system having the taper angle α is measured in the same manner as in the first embodiment described above. The measurement results are indicated in the following table:

TABLE 19

| α  | L  |      |    |      |    |
|----|----|------|----|------|----|
|    | 20 | 22.5 | 25 | 27.5 | 30 |
| 0  | 72 | 61   | 55 | 51   | 46 |
| 5  | 67 | 58   | 53 | 47   | 42 |
| 10 | 62 | 53   | 48 | 43   | 39 |
| 15 | 48 | 41   | 34 | 37   | 21 |

In Table-19, when the taper angle α is equal to 0° and the document-sensor distance L is equal to 25 μm, the measured MTF is equal to 55.

When the taper angle is equal to or less than 10°, MTF decrease a little. In this case, the ratio $S/S_0$ is approximately equal to 1.5. When the taper angle is approximately equal to 15, MTF decreases greatly, and MTF is greatly changed as the document-sensor distance is changed by a predetermined value. In this case, the ratio $S/S_O$ is infinite. When the document-sensor distance is equal to 25 μm and the taper angle α is equal to 10°, MTF is equal to 48. In this case, it is possible to use the light receiving system. It is desirable that the receiving system be used under conditions in which MTF is equal to 53 for the document-sensor distance L of 22.5 μm.

In each case of another refraction index $n_1$, MTF of the light receiving system having the taper angle as shown in Table-10 through Table-14 becomes approximately equal to 50 in the document-sensor distance in which MTF is equal to 55 in a case where the taper angle α is 0°. When the document-sensor distance decreases by approximately 10%, MTF approximately equal to 55 is obtained. Thus, when the taper angle is not equal to 0°, MTF for the document-sensor distance determined in accordance with n×L=K becomes approximately equal to 50. It is desirable that the document-resistance decreases by approximately 10%.

In the embodiments as have been described above, the calculated values and corresponding measurement values are approximately identical to each other. Therefore, it is known that the theoretical conditions used for the above calculation, as has been described above, are suitable for use in the designing of the image detecting unit.

A description will now be given of various materials used for the light receiving system and processes for making various parts of the light receiving system.

The optical waveguide is made of a material such as quartz glass, boric acid glass, chalcogenide glass, lithium oxide ZnO and polymer. A thin film used for forming the optical waveguide is made by a process such as the spattering process, the plasma CVD process, MO CVD process, the sol-gel process, EB evaporation process, the ion exchange process or the metal diffusion process. When the quartz optical waveguide is made by the plasma CVD process, the plasma is obtained by a process such as the ECR plasma process, the RF plasma process, the thermoelectron plasma process or the cold cathode plasma process. When the quartz optical waveguide is made by the plasma CVD process, the material gas can be silane, disilane, tetraethoxysilane, tetramethoxysilane, oxygen, ozone, carbon dioxide, methane, $N_2O$, ammonia, or so on.

A light source in the light emitting system can be a fluorescent lamp, a tungsten lamp, a halogen lamp, a laser diode, EL lamp (electro-luminescence lamp) or so on. At least a cylindrical lens, a micro lens array, a fluorescence film, an optical fiber array, thin plate glass or a highly polymerized film can be used as a member which condenses the light emitted from the light source.

According to the present invention, it is possible for the image detecting unit to detect the image on the document under the condition where the light emitted from the light emitting system is incident on the surface of the document in the optimum incident angle. Thus, the signal-to-noise ratio in the output signal from the light receiving system decreases a little, and as a result, the picture quality of the detected image can be improved.

In addition, when the taper angle is not equal to 0°, the amount of incident light increases by approximately 10% in comparison with the case where the taper angle is equal to 0°. Thus, in this case, it is possible to further decrease the signal-to-noise ratio.

The present invention is not limited to the aforementioned embodiments, and variations and modifications may be made without departing from the scope of the claimed invention.

What is claimed is:

1. An image detecting unit comprising:
   light emitting means for emitting a light beam which is projected onto a surface of a medium on which an image is formed; and
   light receiving means, operatively coupled to said light emitting means, for receiving a light obtained by a reflection of the light emitted from said light emitting means on the surface of said medium, said light receiving means comprising,
   optical wave guide means having a core layer, a clad layer surrounding said core layer and an end surface opposite to the surface of said medium, the light incident to said end surface being transmitted through said optical waveguide, the core layer having a refraction index $n_1$ and the clad layer having a refraction index $n_2$, and
   photoelectric conversion means, coupled to said optical waveguide, for converting the light transmitted through said optical waveguide to said photoelectric conversion means into an image signal,
   wherein the light emitted from said light emitting means is projected on an area, on said surface of said medium, to which said end surface of said optical waveguide is opposed, and an incident angle $\phi$ of the light incident onto said surface of said medium is determined by the following formula:

$$\phi_0 - 25° < \phi < \phi_0 + 18°$$

where said incident angle is an angle between the light beam emitted from said light emitting means and a normal direction of the surface of said medium and $\phi_0$ represents an optimum incident angle defined as the following formula:

$$\phi_0 = [0.012(\phi_0-47)^2 + 93.5]° + [0.06(\theta_0-47)^2 + 12.5-]° + (\ln L)°$$

where L represents a distance between said end surface of said optical waveguide means and the surface of said medium, $\ln L$ is a natural logarithm of L and $\theta_0$ represents a critical angle determined by the following formula:

$$\sin \theta_0 = (n_1^2 - n_2^2)^{\frac{1}{2}}.$$

2. An image detecting unit as claimed in claim 1, wherein a direction in which said optical waveguide is extended is inclined to the surface of said medium by a predetermined angle $\alpha$.

3. An image detecting unit as claimed in claim 2, wherein said predetermined angle is determined by the following angle formula:

$$0° < \alpha < (38 - 120(n_1 - n_2))°.$$

4. A method for arranging light emitting means for emitting a light beam and light receiving means, operatively coupled to said light emitting means, for receiving a light beam so that said light emitting means and said light receiving means face a medium, said light receiving means comprising,
   optical waveguide means, having a core layer, a clad layer surrounding said core layer and an end surface opposite to a surface of said medium, the light incident to said end surface being transmitted through said optical waveguide, and
   photoelectric conversion means, coupled to said optical waveguide, for converting the light transmitted through said optical waveguide to said photoelectric conversion means into an image signal,
   said method comprising the steps of:
   (a) facing the end surface of said optical waveguide to an area on a surface of said medium;
   (b) adjusting an incident angle 0 of the light beam incident onto the area on the surface of said medium so that the following formula is established;

$$\phi_0 - 25° < \phi < \phi_0 + 10°$$

where said incident angle is an angle between the light beam emitted from said light emitting means and a normal direction of the surface of said medium and $\phi_0$ represents an optimum incident angle, said optimum incident angle being an incident angle in which an amount of light transmitted through said optical waveguide means to said photoelectric conversion means becomes approximately maximum.

5. A method as claimed in claim 4, wherein the core layer of said waveguide means has a refraction index $n_1$ and the clad layer thereof has a refraction index $n_2$, and wherein said step (b) uses the optimum incident angle $\phi$ determined by the following formula:

$$\phi_0 = [0.012(\theta_0 - 47)^2 + 93.5]° + [0.06(\theta_0 - 47)^2 + 12.5\text{°} + (\ln L)°$$

where L represents a distance between said end surface of said optical waveguide means and the surface of said medium, 1 nL is a natural logarithm of L and $\theta_0$ represents a critical angle determined by the following formula;

$$\sin \theta_0 = (n_1^2 - n_2^2)^{\frac{1}{2}}.$$

6. A method as claimed in claim 4, wherein a direction in which said optical waveguide is extended is inclined to the surface of said medium by a predetermined angle $\alpha$.

7. A method as claimed in claim 6, wherein said predetermined angle $\alpha$ is determined by the following formula:

$$0° < \alpha < (38 - 120(n_1 - n_2))°.$$

* * * * *